(12) United States Patent
Karlsson

(10) Patent No.: US 10,437,881 B2
(45) Date of Patent: Oct. 8, 2019

(54) INFORMATION RETRIEVAL ARRANGEMENT

(71) Applicant: VOLVO CAR CORPORATION, Gothenburg (SE)

(72) Inventor: Peter Karlsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 451 days.

(21) Appl. No.: 14/962,444

(22) Filed: Dec. 8, 2015

(65) Prior Publication Data

US 2016/0171015 A1 Jun. 16, 2016

(30) Foreign Application Priority Data

Dec. 15, 2014 (EP) .................................. 14197902

(51) Int. Cl.
| | | |
|---|---|---|
| *G06F 16/583* | (2019.01) | |
| *G06K 9/00* | (2006.01) | |
| *G06K 9/32* | (2006.01) | |
| *G08G 1/015* | (2006.01) | |

(Continued)

(52) U.S. Cl.
CPC ...... *G06F 16/5854* (2019.01); *G06F 16/5838* (2019.01); *G06F 16/5846* (2019.01); *G06K 9/00805* (2013.01); *G06K 9/3258* (2013.01); *G08G 1/015* (2013.01); *G08G 1/0175* (2013.01); *G08G 1/166* (2013.01); *G08G 1/167* (2013.01)

(58) Field of Classification Search
CPC ........ G08G 1/166; G08G 1/167; G08G 1/015; G08G 1/0175; G06K 9/3258; G06K 9/00805; G06F 17/30256; G06F 17/30259; G06F 16/5838; G06F 16/5854; G06F 16/5846

USPC ........................................................ 707/769
See application file for complete search history.

(56) References Cited

U.S. PATENT DOCUMENTS 6,202,027 B1 * 3/2001 Alland .................. G01S 7/4004
340/435
7,038,577 B2 * 5/2006 Pawlicki ............... B60W 30/18
340/435

(Continued)

FOREIGN PATENT DOCUMENTS

WO 9716806 5/1997

OTHER PUBLICATIONS

Extended European Search Report for European Application No. EP 14197902.1, Completed by the European Patent Office, dated May 8, 2015, 5 Pages.

*Primary Examiner* — Phong H Nguyen
(74) *Attorney, Agent, or Firm* — Brooks Kushman P.C.

(57) ABSTRACT

An information retrieval arrangement for a host vehicle is configured to retrieve information of at least one surrounding vehicle, surrounding the host vehicle. The arrangement includes a registration plate reading arrangement configured to read registration plate information of a surrounding vehicle and an information retrieving unit configured to retrieve from a database at least one dimension of the surrounding vehicle, based on the read registration plate information. A method of retrieving information of at least one surrounding vehicle using an information retrieval arrangement is also disclosed, as well as a lane change assist arrangement including an information retrieval arrangement, and a vehicle including an information retrieval arrangement.

15 Claims, 2 Drawing Sheets

(51) Int. Cl.
*G08G 1/017* (2006.01)
*G08G 1/16* (2006.01)

(56) References Cited

U.S. PATENT DOCUMENTS

| | | | | |
|---|---|---|---|---|
| 7,167,799 B1 * | 1/2007 | Dolgov | ............... | G08G 1/164 |
| | | | | 701/301 |
| 2004/0016870 A1 * | 1/2004 | Pawlicki | ............... | B60W 30/18 |
| | | | | 250/208.1 |
| 2005/0200467 A1 * | 9/2005 | Au | ............... | B60Q 1/34 |
| | | | | 340/465 |
| 2006/0139619 A1 * | 6/2006 | Fujii | ............... | G01B 11/02 |
| | | | | 356/4.03 |
| 2010/0299000 A1 * | 11/2010 | Nakamura | ............... | B60R 1/00 |
| | | | | 701/1 |
| 2014/0111647 A1 * | 4/2014 | Atsmon | ............... | H04N 7/185 |
| | | | | 348/148 |
| 2014/0201213 A1 * | 7/2014 | Jackson | ............... | G08G 1/0175 |
| | | | | 707/741 |
| 2014/0201266 A1 * | 7/2014 | Jackson | ............... | G08G 1/0175 |
| | | | | 709/203 |
| 2014/0343835 A1 * | 11/2014 | Cooper | ............... | B61L 23/00 |
| | | | | 701/300 |

* cited by examiner

INFORMATION RETRIEVAL ARRANGEMENT

CROSS-REFERENCE TO RELATED APPLICATIONS

This application claims foreign priority benefits under 35 U.S.C. § 119(a)-(d) to European patent application EP 14197902.1, filed Dec. 15, 2014, which is incorporated by reference in its entirety.

TECHNICAL FIELD

The present disclosure relates to an information retrieval arrangement for a host vehicle, a method of retrieving information of at least one surrounding vehicle, a lane change assist arrangement and a vehicle comprising an information retrieval arrangement.

BACKGROUND

Electronic driving-aids have become increasingly present in today's cars. Various sensor systems have been developed to interpret a driving environment external to a host vehicle, which interpretations are used by such driving-aids to support a driver of the vehicle. Performances of these electronic driving-aids are dependent on reliability of inputs from the sensors. The task of interpreting the driving environment external to a host vehicle is challenging and difficulties often arise when it comes to analysing distances to various objects and discern presence of various objects, such as surrounding vehicles.

In view of the above, there is a need for an improved information retrieval arrangement for a host vehicle.

SUMMARY

An object of the present disclosure is to provide an improved information retrieval arrangement for a host vehicle.

According to an embodiment of the disclosure, the object is achieved by an information retrieval arrangement for a host vehicle, the arrangement being configured to retrieve information of at least one surrounding vehicle, surrounding the host vehicle, the arrangement comprising a registration plate reading arrangement configured to read registration plate information of the at least one surrounding vehicle wherein the arrangement further comprises an information retrieving unit configured to retrieve from a database at least one dimension of the at least one surrounding vehicle, based on the read registration plate information.

Since the at least one dimension of the at least one surrounding vehicle is retrieved from a database based on registration plate information, reliable dimensions of surrounding vehicles can be retrieved. As a result, an improved information retrieval arrangement is provided.

As a result, the above mentioned object is achieved.

Further, since reliable dimensions of surrounding vehicles can be retrieved, various driving aid systems and arrangements may utilize these reliable dimensions to perform, improve and/or verify distance calculations, and/or relative speed calculations, to surrounding vehicles. Also, various driving aid systems and arrangement may utilize these reliable dimensions to perform improved interpretations of a driving environment external to a host vehicle. Such a driving aid system may be an autonomous driving control system. By providing an autonomous driving control system using dimensions of surrounding vehicles retrieved from the database, autonomous driving capability of such an autonomous driving control system may be improved as compared to previously autonomous driving control systems.

Optionally, the at least one dimension of the at least one surrounding vehicle, is a physical dimension comprising at least one of length, width or height of the at least one surrounding vehicle.

Optionally, the arrangement further comprises a surrounding vehicle monitoring unit configured to determine a perception angle of a surrounding vehicle and where the arrangement further comprises a calculating unit configured to calculate a distance to the surrounding vehicle using the perception angle of the surrounding vehicle and at least one dimension of the surrounding vehicle retrieved from the database. Since a reliable dimension of the surrounding vehicle, which has been retrieved from the database, is used in the calculation, the distance to a surrounding vehicle can be calculated with high accuracy. As a result, an even further improved information retrieval arrangement is provided.

Optionally, the arrangement further comprises a surrounding vehicle monitoring unit configured to detect presence of, and distance to, a first preceding vehicle and presence of, and distance to, a second preceding vehicle, where the information retrieving unit is configured to retrieve from the database, a length of the first preceding vehicle based on read registration plate information of the first preceding vehicle and where the arrangement further comprises a calculating unit configured to calculate a distance, between the first preceding vehicle and the second preceding vehicle by subtracting the distance to the first vehicle and the length of the first preceding vehicle from the distance to the second vehicle. Since a reliable length of the first preceding vehicle, which has been retrieved from the database, is used in the calculation, the distance between the first preceding vehicle and the second preceding vehicle can be calculated with high accuracy. Calculation of a distance between a first preceding vehicle and a second preceding vehicle is challenging with data from commonly used sensor arrangements such as imaging units, RADAR (RAdio Detection And Ranging) arrangements, mainly because a length of a preceding vehicle is difficult to measure with such arrangements. However, with the arrangement provided such distance can be calculated with high accuracy. As a result, an even further improved information retrieval arrangement is provided. Also, since the distance between a first preceding vehicle and a second preceding vehicle can be calculated with high accuracy, performance of a driving aid system, such as an autonomous driving control system, or lane change managing system, utilizing such a distance may be improved. Thus, the information retrieval arrangement provided will also improve overall occupant safety.

Optionally, the arrangement further comprises a surrounding vehicle monitoring unit arranged to monitor dimensions of a driving environment external to the host vehicle where the arrangement further comprises a calculating unit configured to discern presence of at least one surrounding vehicle, by comparing at least one monitored dimension of the driving environment with at least one dimension of the at least one surrounding vehicle retrieved from the database. Thereby, an even further improved information retrieval arrangement is provided.

Optionally, the arrangement further comprises a surrounding vehicle monitoring unit configured to capture images of a driving environment external to said host vehicle, and where the arrangement further comprises a calculating unit configured to discern presence of at least one surrounding vehicle, by comparing at least one dimension of the captured images with at least one dimension of the at least one surrounding vehicle retrieved from the database. Thereby, an even further improved information retrieval arrangement is provided.

Optionally, the arrangement further comprises a surrounding vehicle monitoring unit configured to determine distinguishing information of the at least one surrounding vehicle comprising at least one of a colour of the surrounding vehicle, or a type of the surrounding vehicle, and where the information retrieving unit is further configured to retrieve corresponding distinguishing information of the at least one surrounding vehicle from the database based on the read registration plate information, where the arrangement is arranged to determine validity of the read registration plate information by comparing the determined distinguishing information with the retrieved distinguishing information. Thereby, an arrangement is provided that is able to distinguish surrounding vehicles having invalid registration plate information. Such invalid registration plate information may for example be a result of a surrounding vehicle having false registration plates, e.g. due to being equipped with stolen registration plates, or be a result of a false reading of the registration plate information. In either case, determination of the validity of the read registration plate information also ensures validity of the retrieved at least one dimension from the database. As a result, an even further improved information retrieval arrangement is provided.

According to some embodiments of the present disclosure, the object is achieved by a lane change assist arrangement comprising an information retrieval arrangement according to some embodiments. Since the lane change assist arrangement comprises an information retrieval arrangement according to some embodiments, an improved lane change assist arrangement is provided.

According to some embodiments of the present disclosure, the object is achieved by a vehicle comprising an information retrieval arrangement according to some embodiments. Since the vehicle comprises an information retrieval arrangement according to some embodiments, an improved vehicle is provided.

According to some embodiments of the present disclosure, the object is achieved by a method of retrieving information of at least one surrounding vehicle, using an information retrieval arrangement for a host vehicle, the arrangement comprising a registration plate reading arrangement and an information retrieving unit, the method comprising:

reading registration plate information of the at least one surrounding vehicle, using the registration plate reading arrangement, and retrieving from a database at least one dimension of the at least one surrounding vehicle, based on the read registration plate information, using the information retrieving unit.

Since the at least one dimension of the at least one surrounding vehicle is retrieved from a database based on registration plate information, a reliable dimension of at least one surrounding vehicle can be obtained. As a result, an improved method of retrieving information of surrounding vehicles is provided.

Optionally, the arrangement further comprises a surrounding vehicle monitoring unit and a calculating unit, where the method further comprises:

determining a perception angle of a surrounding vehicle, using the surrounding vehicle monitoring unit, and calculating a distance to the surrounding vehicle, using the perception angle of the surrounding vehicle and at least one dimension of the surrounding vehicle retrieved from the database, using the calculating unit.

Since at least one reliable dimension of the surrounding vehicle, which has been retrieved from the database, is used in the calculation, the distance to the surrounding vehicle can be calculated with high accuracy. As a result, an even further improved method of retrieving information of surrounding vehicles is provided.

Optionally, the arrangement further comprises a surrounding vehicle monitoring unit and a calculating unit, where the method further comprises:

detecting presence of, and distance to, a first preceding vehicle and presence of, and distance to, a second preceding vehicle, using the surrounding vehicle monitoring unit, retrieving from the database, a length of the first preceding vehicle based on read registration plate information of the first preceding vehicle, using the information retrieving unit, and calculating a distance d, between the first preceding vehicle and the second preceding vehicle by subtracting the distance to the first vehicle and the length of the first preceding vehicle from the distance to the second vehicle, using the calculating unit.

Since a reliable length of the first preceding vehicle, which has been retrieved from the database, is used in the calculation, the distance between the first preceding vehicle and the second preceding vehicle can be calculated with high accuracy. As a result, an even further improved method of retrieving information of surrounding vehicles is provided.

Optionally, the arrangement further comprises a surrounding vehicle monitoring unit and a calculating unit, where the method further comprises:

monitoring dimensions of a driving environment external to the host vehicle, using the surrounding vehicle monitoring unit, and discerning presence of at least one surrounding vehicle, by comparing at least one monitored dimension of the driving environment with at least one dimension of the at least one surrounding vehicle retrieved from the database, using the calculating unit.

Thereby, an even further improved method of retrieving information of at least one surrounding vehicle is provided.

Optionally, the arrangement further comprises a surrounding vehicle monitoring unit and a calculating unit, where the method further comprises:

capturing images of a driving environment external to the host vehicle using the surrounding vehicle monitoring unit, and discerning presence of at least one surrounding vehicle, by comparing at least one dimension of the captured images with at least one dimension of the at least one surrounding vehicle retrieved from the database, using the calculating unit.

Thereby, an even further improved method of retrieving information of at least one surrounding vehicle is provided.

Optionally, the arrangement further comprises a surrounding vehicle monitoring unit, where the method further comprises:

determining distinguishing information of the at least one surrounding vehicle comprising at least one of a colour of the surrounding vehicle, or a type of the surrounding vehicle, using the surrounding vehicle monitoring unit, retrieving corresponding distinguishing information of the at least one surrounding vehicle from the database based on the read registration plate information, using the information retrieving unit, and determining validity of the read registration plate information by comparing the determined distinguishing information with the retrieved distinguishing information, using the arrangement.

Hereby, a method is provided that enables distinguishing of at least one surrounding vehicle having invalid registration plate information. Such invalid registration plate information may for example be a result of a surrounding vehicle having false registration plates, e.g. due to being equipped with stolen registration plates, or be a result of a false reading of the registration plate information. In either case, determination of the validity of the read registration plate information also ensures validity of the retrieved at least one dimension from the database. As a result, an even further improved method of retrieving information of at least one surrounding vehicle is provided.

Further features and advantages of the present disclosure will become apparent when studying the appended claims and the following detailed description. Those skilled in the art will realize that the different features described may be combined to create embodiments other than those described in the following, without departing from the scope of the present disclosure.

BRIEF DESCRIPTION OF THE DRAWINGS

Various non-limiting embodiments of the present disclosure, including particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which example embodiments are shown. Disclosed features of example embodiments may be combined as readily understood by one of ordinary skill in the art. Like numbers refer to like elements throughout.

Well-known functions or constructions will not necessarily be described in detail for brevity and/or clarity.

Figure 1:
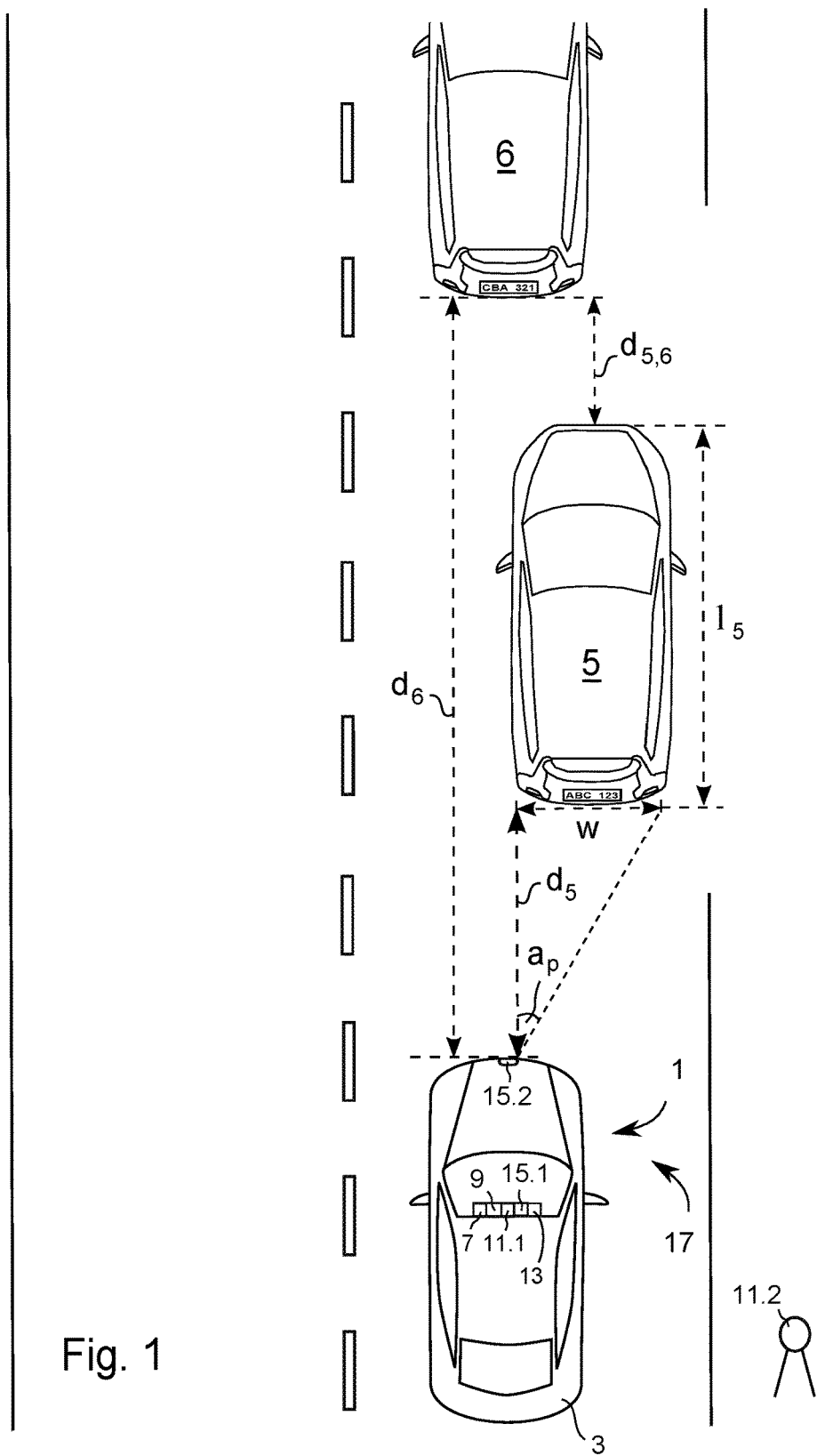
FIG. 1 illustrates an information retrieval arrangement for a host vehicle.

FIG. 1 illustrates an information retrieval arrangement 1 for a host vehicle 3. The arrangement 1 is configured to retrieve information of at least one surrounding vehicle 5, 6 surrounding the host vehicle 3. Surrounding vehicles 5, 6 may be in front of the host vehicle 3, as illustrated in FIG. 1, i.e. preceding vehicles, and/or may be behind the host vehicle 3 (not shown in FIG. 1). The arrangement 1 comprises a registration plate reading arrangement 7 configured to read registration plate information of the at least one surrounding vehicle 5, 6. The arrangement 1 further comprises an information retrieving unit 9 configured to retrieve from a database 11.1, 11.2 at least one dimension w, $I_5$ of the at least one surrounding vehicle 5, 6, based on the read registration plate information.

The registration plate reading arrangement 7 may comprise an imaging unit arranged to capture images of a driving environment external to the host vehicle 3 and discern registration plate information of the at least one surrounding vehicle 5, 6. Such an imaging unit may be arranged in a region of the rear view mirror, as illustrated in FIG. 1, and/or in another region of the host vehicle 3 suitable for capturing images of the driving environment external to said host vehicle 3. Also, the registration plate reading arrangement 7 may comprise two or more imaging units. In such embodiments, one of such two or more imaging units may be arranged to capture images of the driving environment behind the host vehicle 3, to thereby discern registration plate information of the at least one surrounding vehicle traveling behind the host vehicle 3.

The information retrieving unit 9 comprises means for communicating with the database 11.1, 11.2. The information retrieving unit 9 is configured to retrieve from the database 11.1, 11.2 at least one dimension w, $I_5$ of the at least one surrounding vehicle 5, 6 based on the read registration plate information. That is, the information retrieving unit 9 may be configured to output registration plate information, read by the registration plate reading arrangement 7, to the database 11.1, 11.2, and in response thereto retrieve at least one dimension w, $I_5$ of the at least one surrounding vehicle 5, 6 from the database 11.1, 11.2. As illustrated in FIG. 1, the database 11.1 may be arranged in the host vehicle 3 as well as external to the host vehicle 3. The database 11.1, 11.2 may comprise a national or regional database holding dimension information associated with registration plate information.

The at least one dimension w, $I_5$ of the at least one surrounding vehicle 5, 6 may be a physical dimension comprising at least one of length $I_5$, width w or height of the at least one surrounding vehicle 5.

According to some embodiments described herein, the arrangement 1 comprises a surrounding vehicle monitoring unit 15.1, 15.2. In those embodiments, such surrounding vehicle monitoring unit 15.1, 15.2 may comprise one or more sensors such as RADAR (RAdio Detection And Ranging) sensors or LASER (Light Amplification by Stimulated Emission of Radiation) sensors, or LIDAR (LIght Detection And Ranging) sensors, or one or more imaging sensors, such as one or more camera units.

According to some embodiments, the arrangement 1 further comprises a surrounding vehicle monitoring unit 15.1, 15.2 configured to determine a perception angle $a_p$ of a surrounding vehicle 5. In such embodiments, the arrangement 1 further comprises a calculating unit 13 configured to calculate a distance $d_5$ to the surrounding vehicle 5 using the perception angle $a_p$ of the surrounding vehicle 5 and at least one dimension w of the surrounding vehicle 5 retrieved from the database 11.1, 11.2. Thereby the distance $d_5$ can be calculated with high reliability since a reliable dimension of the surrounding vehicle 5, having been retrieved from the database 11.1, 11.2, is used in the calculation. A trigonometric function may be used in the calculation of the distance $d_5$. In the example shown in FIG. 1, such a function may for example be $d_5 = w/(\tan a_p)$ In the example shown in FIG. 1, a width w of the surrounding vehicle 5 retrieved from the database 11.1, 11.2 is used in the calculation of the distance $d_5$. As an alternative, or in combination, a height or an area of a surrounding vehicle 5 may be retrieved from the database 11.1, 11.2 and used in the calculation of the distance $d_5$.

According to some embodiments, the arrangement 1 further comprises a surrounding vehicle monitoring unit 15.1, 15.2 configured to detect presence of, and distance $d_5$ to, a first preceding vehicle 5 and presence of, and distance $d_6$ to, a second preceding vehicle 6, where the information retrieving unit 9 is configured to retrieve from the database 11.1, 11.2, a length $I_5$ of the first preceding vehicle 5 based on read registration plate information of the first preceding vehicle 5 and where the arrangement 1 further comprises a calculating unit 13 configured to calculate a distance $d_{5,6}$ between the first preceding vehicle 5 and the second preceding vehicle 6 by subtracting the distance $d_5$ to the first vehicle 5 and the length $I_5$ of the first preceding vehicle 5 from the distance $d_6$ to the second vehicle 6.

According to some embodiments, the arrangement 1 further comprises a surrounding vehicle monitoring unit 15.1, 15.2 arranged to monitor dimensions of a driving environment external to the host vehicle 3 where the arrangement 1 further comprises a calculating unit 13 configured to discern presence of at least one surrounding vehicle 5, 6 by comparing at least one monitored dimension of the driving environment with at least one dimension w, $I_5$ of the at least one surrounding vehicle 5, 6 retrieved from the database 11.1, 11.2. Such discerning of presence of at least one surrounding vehicle 5, 6 may for example comprise comparing of a monitored dimension, which is estimated to represent a length of a cluster of surrounding vehicles 5, 6, with a length $I_5$ of a nearest surrounding vehicle 5 retrieved from the database 11.1, 11.2. Thereby, the arrangement 1 will be able to discern between a situation in which a long vehicle, such as a bus or a truck, is surrounding the host vehicle or whether it is two or more vehicles 5, 6 which surrounds the host vehicle 3.

As an alternative, or in combination, such discerning of presence of at least one surrounding vehicle 5, 6 may be performed in the following manner. One or more dimensions, such as length, width, height and/or area, of the at least one surrounding vehicle 5, 6 are retrieved from the database 11.1, 11.2. Such one or more dimensions are then compared with a monitored driving environment to discern presence of at least one surrounding vehicle 5, 6. That is, if the database 11.1, 11.2 shows that a certain surrounding vehicle has certain dimensions, the surrounding vehicle monitoring unit 15.1, 15.2 will more easily discern presence of such a vehicle in a driving environment.

Such discerning of presence of at least one surrounding vehicle 5, 6 may continuously be performed and the dimensions of the at least one surrounding vehicle 5, 6 retrieved from the database 11.1, 11.2 may further improve representation of a surrounding vehicle 5, 6 in the surrounding vehicle monitoring unit 15.1, 15.2. Since the dimensions of the at least one surrounding vehicle 5, 6 retrieved from the database 11.1, 11.2 is used, such representation may be made in a more stable manner, than would be possible without the dimensions retrieved from the database 11.1, 11.2.

According to some embodiments, the arrangement 1 further comprises a surrounding vehicle monitoring unit 15.1, 15.2 configured to capture images of a driving environment external to said host vehicle 3 and where the arrangement 1 further comprises a calculating unit 13 configured to discern presence of at least one surrounding vehicle 5 by comparing at least one dimension of the captured images with at least one dimension w, $I_5$ of the at least one surrounding vehicle 5 retrieved from the database 11.1, 11.2.

Such discerning of presence of at least one surrounding vehicle 5, 6 may be performed in the following manner. One or more dimensions, such as length, width, height and/or area, of the at least one surrounding vehicle 5, 6 are retrieved from the database 11.1, 11.2. Such one or more dimensions are then compared with dimensions of captured images of the driving environment external to the host vehicle 3 to discern presence of at least one surrounding vehicle 5, 6. That is, if the database 11.1, 11.2 shows that a certain surrounding vehicle has certain dimensions, the surrounding vehicle monitoring unit 15.1, 15.2 will more easily discern presence of such a vehicle in the driving environment.

According to some embodiments, the arrangement 1 further comprises a surrounding vehicle monitoring unit 15.1, 15.2 configured to determine distinguishing information of the at least one surrounding vehicle 5, 6 comprising at least one of a colour of the surrounding vehicle 5, 6 and/or a type of the surrounding vehicle 5. A type of the surrounding vehicle 5 may comprise a car, a truck, a trailer, a motorcycle, etc. The information retrieving unit 9 may further be configured to retrieve corresponding distinguishing information of the at least one surrounding vehicle 5, 6 from the database 11.1, 11.2 based on the read registration plate information. The arrangement 1 may further be arranged to determine validity of the read registration plate information by comparing the determined distinguishing information with the retrieved distinguishing information.

Thereby, the arrangement 1 may distinguish surrounding vehicles having invalid registration plate information. Such invalid registration plate information may for example be a result of a surrounding vehicle having false registration plates, e.g. due to being equipped with stolen registration plates, or due to a false reading of the registration plate information. In either case, the determination of the validity of the read registration plate information ensures validity of the retrieved at least one dimension from the database 11.1, 11.2. As a result, an even further improved information retrieval arrangement 1 is provided.

The information retrieval arrangement 1 may be comprised in an autonomous driving control system utilizing dimensions of surrounding vehicles 5, 6 retrieved from the database to perform, improve and/or verify distance calculations, and/or relative speed calculations, to the surrounding vehicles 5, 6. Also, such an autonomous driving control system may utilize the retrieved dimensions to perform improved interpretations of a driving environment external to a host vehicle 3. Thereby, autonomous driving capability of such an autonomous driving control system may be improved as compared to previously autonomous driving control systems.

FIG. 1 also illustrates a lane change assist arrangement 17 comprising an information retrieval arrangement 1 according to some embodiments.

FIG. 1 also illustrates a vehicle 3 comprising an information retrieval arrangement 1 according to some embodiments.

The various arrangements and units described herein may comprise one or more processors or any other type of computing device, such as a microprocessor, microcontroller, programmable digital signal processor (DSP) or any other programmable device. Any such arrangement or unit may also, or instead, include an application specific integrated circuit (ASIC), a programmable gate array or programmable array logic, a programmable logic device, or a digital signal processor (DSP). The one or more processors, as well as the other digital hardware, may be included in a single ASIC, or distributed among several separate components, whether individually packaged or assembled into a SoC (System-on-a-Chip). Where the arrangement or unit includes a programmable device such as a processor, microprocessor, microcontroller or programmable digital signal processor, the arrangement or unit may further include a memory or storage for storing data and/or computer executable code for controlling operation of the programmable device and/or for performing any of the operations or functions described herein. The arrangement or unit may comprise a computer readable medium which may be any type of memory device, including one of a removable nonvolatile/volatile random access memory, a hard disk drive, a floppy disk, a CD-ROM, a DVD-ROM, a USB memory, an SD memory card, or any type of computer readable medium known in the art.

Figure 2:
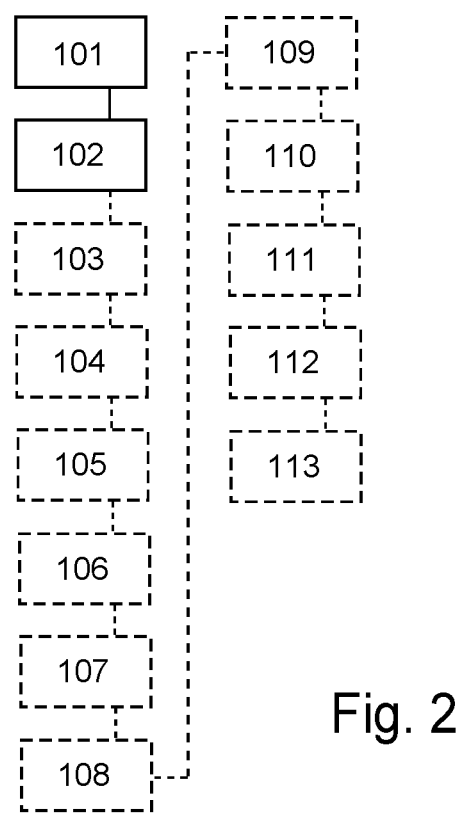
FIG. 2 illustrates a method of retrieving information of at least one surrounding vehicle.

FIG. 2 illustrates a method 100 of retrieving information of at least one surrounding vehicle using an information retrieval arrangement for a host vehicle. Since such an information retrieval arrangement 1 is shown in FIG. 1, below reference is made to FIG. 1 as well as to FIG. 2. The arrangement 1 comprises a registration plate reading arrangement 7 and an information retrieving unit 9, where the method 100 comprises:

reading 101 registration plate information of the at least one surrounding vehicle 5, 6, using the registration plate reading arrangement 7, and retrieving 102 from a database 11.1, 11.2 at least one dimension w, $I_5$ of the at least one surrounding vehicle 5, 6, based on the read registration plate information, using the information retrieving unit 9.

The arrangement 1 may further comprise a surrounding vehicle monitoring unit 15.1, 15.2 and a calculating unit 13, and the method 100 may further comprise:

determining 103 a perception angle $a_p$ of a surrounding vehicle 5, using the surrounding vehicle monitoring unit 15.1, 15.2, and calculating 104 a distance $d_5$ to the surrounding vehicle 5, using the perception angle $a_p$ of the surrounding vehicle 5 and at least one dimension w of the surrounding vehicle 5 retrieved from the database 11.1, 11.2, using the calculating unit 13.

The arrangement 1 may further comprise a surrounding vehicle monitoring unit 15.1, 15.2 and a calculating unit 13, and the method 100 may further comprise:

detecting 105 presence of, and distance $d_5$ to, a first preceding vehicle 5 and presence of, and distance $d_6$ to, a second preceding vehicle 6, using the surrounding vehicle monitoring unit 15.1, 15.2, retrieving 106 from the database 11.1, 11.2, a length $I_5$ of the first preceding vehicle 5 based on read registration plate information of the first preceding vehicle 5, using the information retrieving unit 9, and calculating 107 a distance $d_{5,6}$ between the first preceding vehicle 5 and the second preceding vehicle 6 by subtracting the distance $d_5$ to the first vehicle 5 and the length $I_5$ of the first preceding vehicle 5 from the distance $d_6$ to the second vehicle 6, using the calculating unit 13.

The arrangement 1 may further comprise a surrounding vehicle monitoring unit 15.1, 15.2 and a calculating unit 13, and the method 100 may further comprise:

monitoring 107 dimensions of a driving environment external to the host vehicle 3, using the surrounding vehicle monitoring unit 15.1, 15.2, and discerning 108 presence of at least one surrounding vehicle 5, 6 by comparing at least one monitored dimension of the driving environment with at least one dimension w, $I_5$ of the at least one surrounding vehicle 5 retrieved from the database 11.1, 11.2, using the calculating unit 13.

The arrangement 1 may further comprise a surrounding vehicle monitoring unit 15.1, 15.2 and a calculating unit 13, and the method 100 may further comprise:

capturing 109 images of a driving environment external to said host vehicle 3 using the surrounding vehicle monitoring unit 15.1, 15.2, and discerning 110 presence of at least one surrounding vehicle 5, 6 by comparing at least one dimension of the captured images with at least one dimension w, $I_5$ of the at least one surrounding vehicle 5 retrieved from the database 11.1, 11.2, using the calculating unit 13.

The arrangement 1 may further comprise a surrounding vehicle monitoring unit 15.1, 15.2, and the method 100 may further comprise:

determining 111 distinguishing information of the at least one surrounding vehicle 5, 6 comprising at least one of a colour of the surrounding vehicle 5, 6, or a type of the surrounding vehicle 5, 6, using the surrounding vehicle monitoring unit 15.1, 15.2, retrieving 112 corresponding distinguishing information of the at least one surrounding vehicle 5, 6 from the database 11.1, 11.2 based on the read registration plate information, using the information retrieving unit 9, and determining 113 validity of the read registration plate information by comparing the determined distinguishing information with the retrieved distinguishing information, using the arrangement 1.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An information retrieval arrangement for a host road vehicle comprising a driving aid system, the arrangement configured to retrieve information of at least one surrounding road vehicle independent from the host vehicle, surrounding the host vehicle, the arrangement comprising:

a registration plate reading arrangement comprising a processor and configured to read registration plate information of the at least one surrounding vehicle;

an information retrieving unit comprising a processor and configured to retrieve from a database at least one dimension of the at least one surrounding vehicle, based on the read registration plate information, wherein the at least one dimension of the at least one surrounding vehicle is a physical dimension comprising at least one of a length, width or height of the at least one surrounding vehicle, wherein the at least one dimension is utilized by the driving aid system to perform and/or verify calculations of distance and/or relative speed to the at least one surrounding vehicle;

a surrounding vehicle monitoring unit configured to determine a perception angle of a surrounding vehicle, wherein the perception angle is determined from a perceived dimension of the surrounding vehicle; and a calculating unit configured to calculate a distance to the surrounding vehicle using the perception angle of the surrounding vehicle and the at least one dimension of the surrounding vehicle retrieved from the database.

2. The information retrieval arrangement according to claim 1 wherein:

the surrounding vehicle monitoring unit is configured to detect a presence of, and distance to, a first preceding vehicle and a presence of, and distance to, a second preceding vehicle, where the information retrieving unit is configured to retrieve from the database, a length of the first preceding vehicle based on read registration plate information of the first preceding vehicle; and the calculating unit is configured to calculate a distance between the first preceding vehicle and the second preceding vehicle by subtracting the distance to the first vehicle and the length of the first preceding vehicle from the distance to the second vehicle.

3. The information retrieval arrangement according to claim 1 wherein:

the surrounding vehicle monitoring unit is configured to monitor dimensions of a driving environment external to the host vehicle; and the calculating unit is configured to discern a presence of at least one surrounding vehicle by comparing at least one monitored dimension of the driving environment with at least one dimension of the at least one surrounding vehicle retrieved from the database.

4. The information retrieval arrangement according to claim 1 wherein:

the surrounding vehicle monitoring unit is configured to capture images of a driving environment external to the host vehicle; and the calculating unit is configured to discern a presence of at least one surrounding vehicle by comparing at least one dimension of the captured images with at least one dimension of the at least one surrounding vehicle retrieved from the database.

5. The information retrieval arrangement according to claim 1 wherein:

the surrounding vehicle monitoring unit configured to determine distinguishing information of the at least one surrounding vehicle comprising at least one of a color of the surrounding vehicle or a type of the surrounding vehicle;

wherein the information retrieving unit is further configured to retrieve corresponding distinguishing information of the at least one surrounding vehicle from the database based on the read registration plate information, and wherein the arrangement is arranged to determine validity of the read registration plate information by comparing the determined distinguishing information with the retrieved distinguishing information.

6. A lane change assist arrangement comprising an information retrieval arrangement according to claim 1.

7. A vehicle comprising an information retrieval arrangement according to claim 1.

8. A driving aid system comprising the information retrieval arrangement of claim 1.

9. The information retrieval arrangement according to claim 3 wherein to discern a presence of at least one surrounding vehicle, the calculating unit is configured to compare a monitored dimension from the surrounding vehicle monitoring unit estimated to represent a length of a cluster of surrounding vehicles with a length of a nearest surrounding vehicle retrieved from the database to discern between a single vehicle or a plurality of vehicles surrounding the host vehicle.

10. A method performed by an information retrieval arrangement of a host road vehicle for retrieving information of at least one surrounding road vehicle independent from the host vehicle, the host vehicle comprising a driving aid system, where the arrangement comprises a registration plate reading arrangement comprising a processor, an information retrieving unit comprising a processor, a surrounding vehicle monitoring unit, and a calculating unit, the method comprising:

reading registration plate information of the at least one surrounding vehicle, using the registration plate reading arrangement;

retrieving from a database at least one dimension of the at least one surrounding vehicle, based on the read registration plate information, using the information retrieving unit, wherein the at least one dimension of the at least one surrounding vehicle is a physical dimension comprising at least one of a length, width or height of the at least one surrounding vehicle;

utilizing the at least one dimension to perform and/or verify calculations of distance and/or relative speed to the at least one surrounding vehicle, using the driving aid system;

determining a perception angle of a surrounding vehicle, using the surrounding vehicle monitoring unit, wherein the perception angle is determined from a perceived dimension of the surrounding vehicle; and calculating a distance to the surrounding vehicle, using the perception angle of the surrounding vehicle and at least one dimension of the surrounding vehicle retrieved from the database, using the calculating unit.

11. The method according to claim 10 where the information retrieval arrangement further comprises a surrounding vehicle monitoring unit and a calculating unit, the method further comprising:

detecting a presence of, and distance to, a first preceding vehicle and a presence of, and distance to, a second preceding vehicle, using the surrounding vehicle monitoring unit;

retrieving from the database, a length of the first preceding vehicle based on read registration plate information of the first preceding vehicle, using the information retrieving unit; and calculating a distance between the first preceding vehicle and the second preceding vehicle by subtracting the distance to the first vehicle and the length of the first preceding vehicle from the distance to the second vehicle, using the calculating unit.

12. The method according to claim 10 where the information retrieval arrangement further comprises a surrounding vehicle monitoring unit and a calculating unit, the method further comprising:

monitoring dimensions of a driving environment external to the host vehicle, using the surrounding vehicle monitoring unit; and discerning a presence of at least one surrounding vehicle by comparing at least one monitored dimension of the driving environment with at least one dimension of the at least one surrounding vehicle retrieved from the database, using the calculating unit.

13. The method according to claim 10 where the information retrieval arrangement further comprises a surrounding vehicle monitoring unit and a calculating unit, the method further comprising:

capturing images of a driving environment external to the host vehicle using the surrounding vehicle monitoring unit; and discerning a presence of at least one surrounding vehicle by comparing at least one dimension of the captured images with at least one dimension of the at least one surrounding vehicle retrieved from the database, using the calculating unit.

14. The method according to claim 10 where the information retrieval arrangement further comprises a surrounding vehicle monitoring unit, the method further comprising:
- determining distinguishing information of the at least one surrounding vehicle comprising at least one of a color of the surrounding vehicle or a type of the surrounding vehicle, using the surrounding vehicle monitoring unit;
- retrieving corresponding distinguishing information of the at least one surrounding vehicle from the database based on the read registration plate information, using the information retrieving unit; and
- determining validity of the read registration plate information by comparing the determined distinguishing information with the retrieved distinguishing information, using the arrangement.

15. The method according to claim 12 wherein discerning a presence of at least one surrounding vehicle comprises comparing, using the calculating unit, a monitored dimension from the surrounding vehicle monitoring unit estimated to represent a length of a cluster of surrounding vehicles with a length of a nearest surrounding vehicle retrieved from the database to discern between a single vehicle or a plurality of vehicles surrounding the host vehicle.

\* \* \* \* \*